(12) United States Patent  
Drago et al.

(10) Patent No.: US 7,605,700 B2
(45) Date of Patent: Oct. 20, 2009

(54) RFID TAG DATA RETENTION VERIFICATION AND REFRESH

(75) Inventors: Randall Allen Drago, Gaithersburg, MD (US); Ming-Hao Sun, Gaithersburg, MD (US); Chun-Huei Bair, Silver Spring, MD (US); Kevin J. Powell, Annapolis, MD (US); Omid Roshan-Afshar, Herndon, VA (US); Theodore Hockey, Mount Airy, MD (US); Jonathan Pfeifer, North Potomac, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 70 days.

(21) Appl. No.: 11/376,265

(22) Filed: Mar. 16, 2006

(65) Prior Publication Data

US 2007/0229230 A1    Oct. 4, 2007

(51) Int. Cl.
*G08B 13/14* (2006.01)
*H04Q 5/22* (2006.01)
*G11C 29/00* (2006.01)

(52) U.S. Cl. .................. 340/572.1; 340/10.1; 714/721
(58) Field of Classification Search .............. 340/571, 340/572.1–572.9, 10.1–10.52; 365/222, 365/185.22; 714/718–721
See application file for complete search history.

(56) References Cited

U.S. PATENT DOCUMENTS

| | | | | |
|---|---|---|---|---|
| 5,945,920 A | * | 8/1999 | Maletsky | 340/10.52 |
| 6,151,246 A | * | 11/2000 | So et al. | 365/185.09 |
| 6,288,629 B1 | * | 9/2001 | Cofino et al. | 340/10.1 |
| 6,392,544 B1 | * | 5/2002 | Collins et al. | 340/572.7 |
| 6,560,725 B1 | * | 5/2003 | Longwell et al. | 714/54 |
| 6,731,557 B2 | * | 5/2004 | Beretta | 365/222 |
| 7,079,418 B2 | * | 7/2006 | Hotaka | 365/185.21 |
| 7,079,421 B2 | * | 7/2006 | Yaoi et al. | 365/185.24 |
| 7,190,257 B2 | * | 3/2007 | Maltseff et al. | 340/10.51 |
| 7,243,277 B2 | * | 7/2007 | Wu et al. | 714/721 |
| 7,333,018 B2 | * | 2/2008 | Singh et al. | 340/572.4 |
| 2006/0022801 A1 | | 2/2006 | Husak et al. | |
| 2007/0069866 A1 | * | 3/2007 | Schuessler et al. | 340/10.4 |

FOREIGN PATENT DOCUMENTS

| | | |
|---|---|---|
| EP | 1505536 A | 2/2005 |
| JP | 2003076953 A | 3/2003 |
| WO | 98/28748 A | 7/1998 |

OTHER PUBLICATIONS

Search Report and Written Opinion for Internatinoal Application No. PCT/US07/05196 mailed Jun. 6, 2008, 14 pages.
Supplementary European Search Report and Written Opinion of the European Searching Authority for European Application No. 07751924.0 mailed Apr. 20, 2009.

* cited by examiner

*Primary Examiner*—Jennifer Mehmood

(57) ABSTRACT

Methods, systems, and apparatuses for monitoring and refreshing data stored in radio frequency identification (RFID) tags are described. A voltage margin for data stored in memory of a tag is checked. If the voltage margin has decreased to an undesirable level, the data stored in the tag is refreshed.

7 Claims, 14 Drawing Sheets

RFID TAG DATA RETENTION VERIFICATION AND REFRESH

BACKGROUND OF THE INVENTION

1. Field of the Invention

The invention relates to radio frequency identification (RFID) tags, and in particular, to data retention and refresh in RFID tags.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Because the reader "interrogates" RFID tags, and receives signals back from the tags in response to the interrogation, the reader is sometimes termed as "reader interrogator" or simply "interrogator."

With the maturation of RFID technology, efficient communication between tags and interrogators has become a key enabler in supply chain management, especially in manufacturing, shipping, and retail industries, as well as in building security installations, healthcare facilities, libraries, airports, warehouses etc.

Each tag typically stores a unique identification number and may store further data. A tag's identification number is read by a reader to uniquely identify the tag. The identification number may be stored in a non-volatile memory of the tag. It is desirable for tags to have a long shelf life, which may be 10 years or even more. Thus, for a tag to be uniquely identifiable for its lifetime, the identification number stored in the non-volatile memory may need to remain accurately stored in the memory for 10 years or more. However, even non-volatile memories can lose data over such long time periods. Thus, some tags may lose their identification number if stored in a non-volatile memory for a long period of time, and thus may become unidentifiable.

Thus, what is needed are improved ways of ensuring that data, such as the identification number, is maintained in a tag for long periods of time, such as for the lifetime of the tag.

BRIEF SUMMARY OF THE INVENTION

Methods, systems, and apparatuses for monitoring and refreshing data stored in radio frequency identification (RFID) tags are described. A voltage margin for data stored in memory of a tag is checked. If the voltage margin has decreased to an undesirable level, the data stored in the tag is refreshed.

In an example aspect of the present invention, a method and system for retention of data stored in a non-volatile memory of a radio frequency identification (RFID) tag is described. Whether a desired voltage margin is present in a memory location of the non-volatile memory of the tag is determined. The data stored in the non-volatile memory is refreshed if it is determined that the desired voltage margin is not present.

In further aspects, any number of one or more memory locations of the non-volatile memory can be checked for the desired voltage margin.

In a further aspect, a command to verify data retention is received by the tag. Thus, the tag initiates the determination of whether the desired voltage margin is present. Alternatively, the tag may initiate the determination of whether the desired voltage margin is present without external stimulus.

In further aspects, the data stored in the non-volatile memory can be refreshed in a variety of ways. For example, the tag can transmit a request for a refresh of a data stored in the non-volatile memory. The refresh data is received. The received refresh data is programmed into the non-volatile memory by the tag. In an alternative aspect, the tag may read the data stored in the non-volatile memory, and use the read data as the refresh data to re-program the non-volatile memory.

In another aspect of the present invention, a radio frequency identification (RFID) tag is described. The tag includes a substrate, an antenna on the substrate, and an integrated circuit disposed on the substrate. The integrated circuit includes a non-volatile memory and a margin checker. The margin checker determines whether a desired voltage margin is present in a memory location of the non-volatile memory.

In a further aspect, the integrated circuit may include a refresh requester that transmits a request for refresh data to refresh data stored in the non-volatile memory if the margin checker determines that the desired voltage margin is not present.

In another aspect of the present invention, a system and method of remotely verifying data stored in a radio frequency identification (RFID) tag is described. A command to verify data retention is generated. The generated command is transmitted to a tag in a first transmitted signal. A signal is received from the tag in response to the generated command. If the response signal includes a refresh request from the tag, refresh data is generated and transmitted to the tag in a second transmitted signal.

In another aspect of the present invention, a radio frequency identification (RFID) reader is described. The reader includes a verifier module, a transmitter, a receiver, and a refresh module. The verifier module is configured to generate a command to verify data retention to a tag. The transmitter is configured to transmit the generated command in a first transmitted signal. The receiver is configured to receive a signal in response to the generated command from the tag. The refresh module is configured to generate refresh data if the response signal comprises a refresh request from the tag. The transmitter is configured to transmit the refresh data to the tag in a second transmitted signal.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
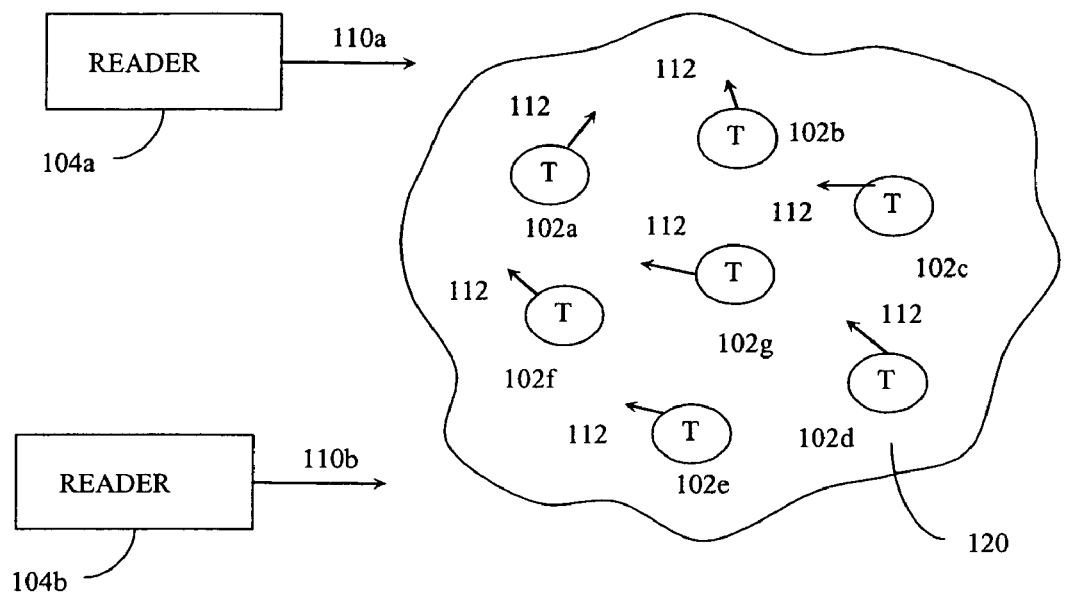
FIG. 1 shows an environment where RFID readers communicate with an exemplary population of RFID tags.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

Methods, systems, and apparatuses for RFID devices are described herein. Furthermore, methods, systems, and apparatuses for improved data retention in tags are described.

Memory in tags is used to store data such as a unique identification number. Over time, data stored in the memory of tags, including in non-volatile memory, can be lost. For example, a tag may have a lifetime of 10 years or more. If the identification number of the tag is lost from tag memory, the tag will no longer be identifiable. Thus, the tag will no longer be able to provide its function of identifying an item with which it is associated.

Embodiments of the present invention overcome problems with tag data loss present in conventional systems. For example, according to embodiments, a voltage margin of data stored in a memory location of a tag is checked. If the voltage margin has decreased to an undesirable amount, the data stored in the tag can be refreshed. Such a voltage margin check can be performed as often as desired, to verify that data stored in tag memory will not be lost. This data verification and refresh technique can be used to ensure that tags store relevant data as long as needed.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

EXAMPLE RFID SYSTEM EMBODIMENT

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110 having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
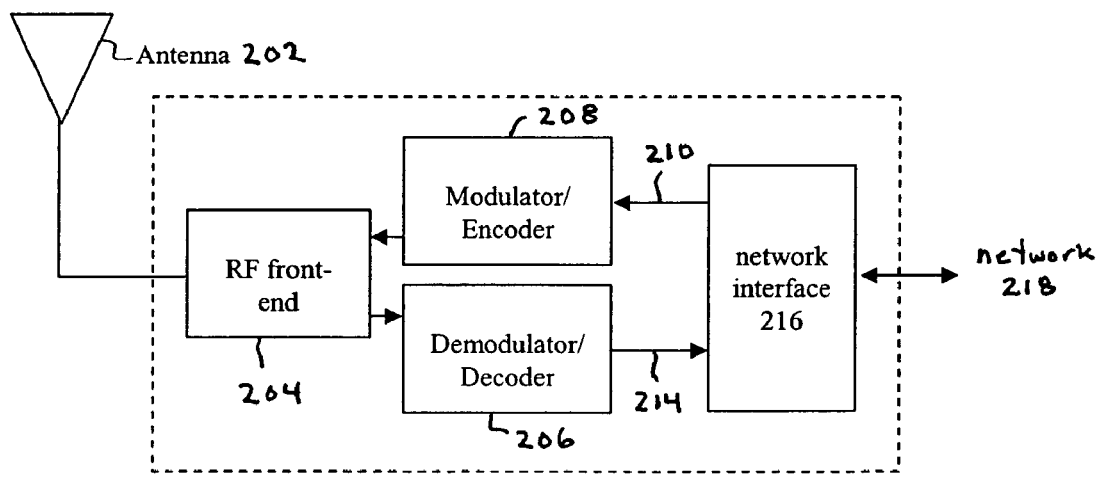
FIG. 2 shows a block diagram of receiver and transmitter portions of a RFID reader.

FIG. 2 shows a block diagram of a receiver and transmitter portion 220 of an example RFID reader 104. Reader 104 includes one or more antennas 202, a RF front-end 204, a demodulator/decoder 206, a modulator/encoder 208, and a network interface 216. These components of reader 104 may include software, hardware, and/or firmware, or any combination thereof, for performing their functions.

Reader 104 has at least one antenna 202 for communicating with tags 102 and/or other readers 104. RF front-end 204 may include one or more antenna matching elements, amplifiers, filters, an echo-cancellation unit, a down-converter, and/or an up-converter. RF front-end 204 receives a tag response signal through antenna 202 and down-converts (if necessary) the response signal to a frequency range amenable to further signal processing. Furthermore, RF front-end 204 receives a modulated encoded interrogation signal from modulator/encoder 208, up-converts (if necessary) the interrogation signal, and transmits the interrogation signal to antenna 202 to be radiated.

Antenna(s) 202 may be any type of reader antenna known to persons skilled in the relevant art(s). For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Demodulator/decoder 206 is coupled to an output of RF front-end 204, receiving a modulated tag response signal from RF front-end 204. Demodulator/decoder 206 demodulates the tag response signal. For example, the tag response signal may include backscattered data encoded according to FM0 or Miller encoding formats. Demodulator/decoder 206 outputs a decoded data signal 214. Decoded data signal 214 may be further processed in reader 104. Additionally or alternatively, decoded data signal 214 may be transmitted to a subsequent computer system for further processing.

Modulator/encoder 208 is coupled to an input of RF front-end 204, and receives an interrogation request 210. Modulator/encoder 208 encodes interrogation request 210 into a signal format, such as one of FM0 or Miller encoding formats, modulates the encoded signal, and outputs the modulated encoded interrogation signal to RF front-end 204.

In an embodiment, reader 104 includes network interface 216 to interface reader 104 with a communications network 218. When present, network interface 216 is used to provide interrogation request 210 to reader 104, which may be received from a remote server coupled to communications network 218. Furthermore, network interface 216 is used to transmit decoded data signal 214 from reader 104 to a remote server coupled to communications network 218. In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In further embodiments, alternative mechanisms for initiating an interrogation request may be present in reader 104. For example, reader 104 may include a finger-trigger mechanism, a keyboard, a graphical user interface (GUI), and/or a voice activated mechanism with which a user of reader 104 may interact to initiate an interrogation by reader 104.

Figure 3:
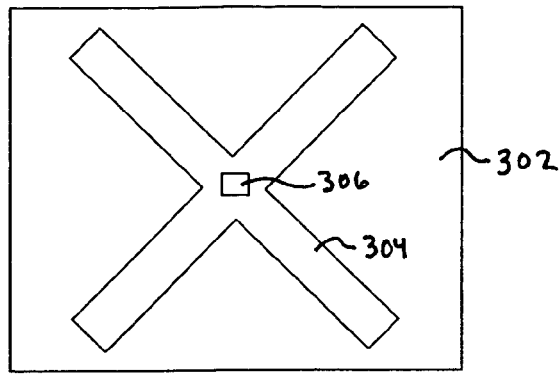
FIG. 3 shows a plan view of an example radio frequency identification (RFID) tag.

The present invention is applicable to any type of RFID tag. FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one or more separate antennas. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location. IC 306 controls operation of tag 102, and transmits signals to, and receives signals from RFID readers using antenna 304. Tag 102 may additionally include further elements, including an impedance matching network and/or other circuitry. The present invention is applicable to tag 102, and to other types of tags, including surface wave acoustic (SAW) type tags.

Figure 4:
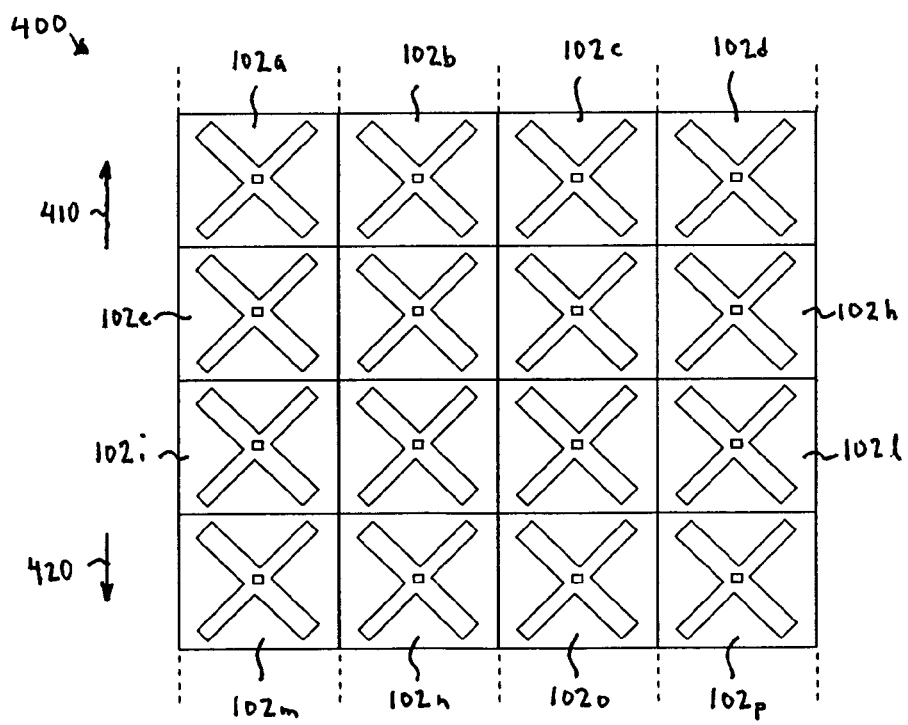
FIG. 4 shows a plan view of an example web of tags that is a continuous roll type.

Volume production of RFID tags, such as tag 102, is typically accomplished on a printing web based system. For example, in such a system, the tags are assembled in a web of substrates, which may be a sheet of substrates, a continuous roll of substrates, or other grouping of substrates. For instance, FIG. 4 shows a plan view of an example web 400 that is a continuous roll type. As shown in FIG. 4, web 400 may extend further in the directions indicated by arrows 410 and 420. Web 400 includes a plurality of tags 102a-p. In the example of FIG. 4, the plurality of tags 102a-p in web 400 is arranged in a plurality of rows and columns. The present invention is applicable to any number of rows and columns of tags, and to other arrangements of tags.

Figure 5:
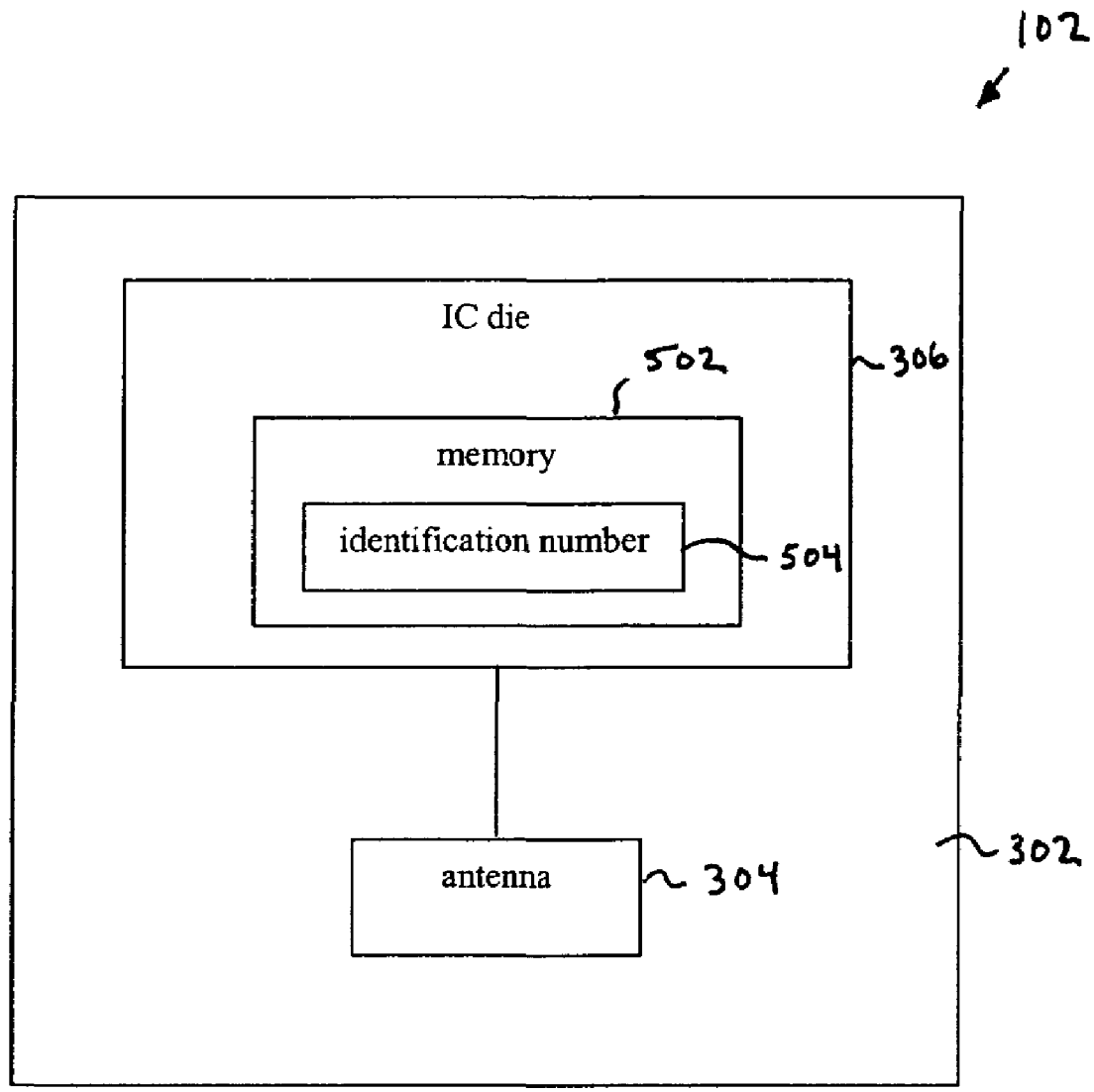
FIG. 5 shows further example detail of a tag.

FIG. 5 shows an example detailed block diagram of tag 102. As shown in FIG. 5, integrated circuit 306 (indicated as an IC die in FIG. 5) of tag 102 includes a memory 502, which may be a non-volatile memory, for example. Memory 502 stores data, including an identification number 504. Identification number 504 typically is a unique identifier (at least in a local environment) for tag 102. For instance, when tag 102 is interrogated by a reader (e.g., receives interrogation signal 110 shown in FIG. 1), tag 102 may respond with identification number 504 to identify itself. Identification number 504 may be used by a computer system to associate tag 102 with its particular associated object/item.

Figure 6A:
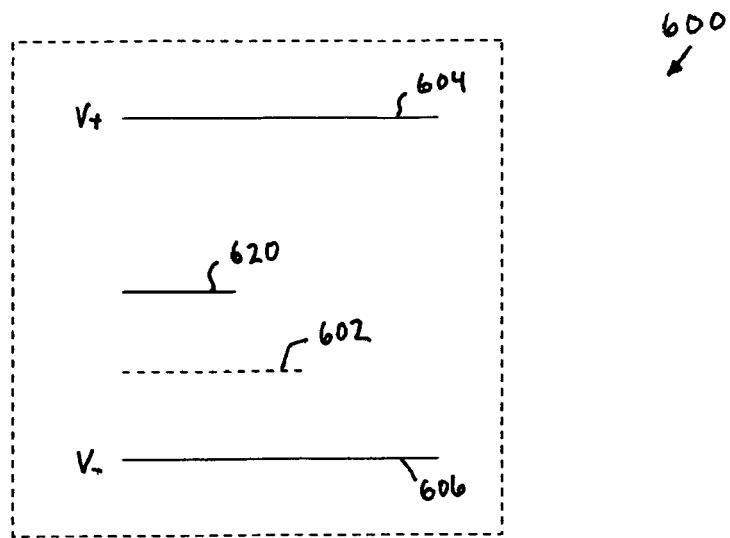
FIGS. 6A-6D show voltage values in a memory location of a tag memory.
Figure 6B:
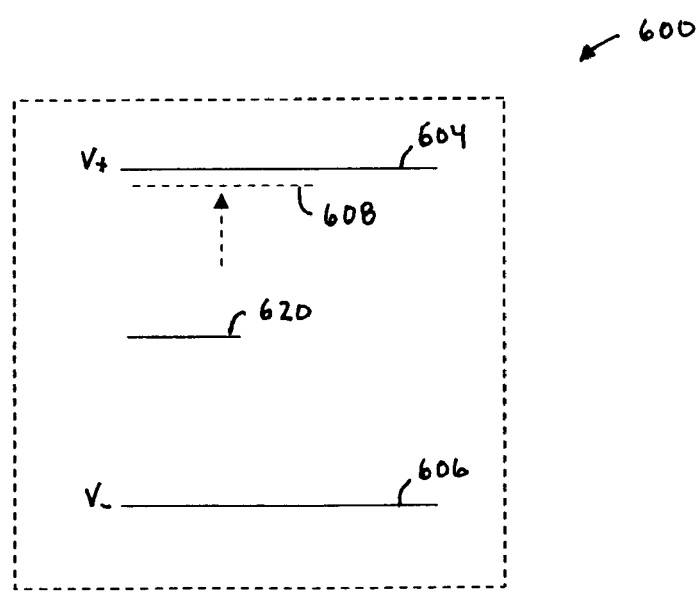
Figure 6C:
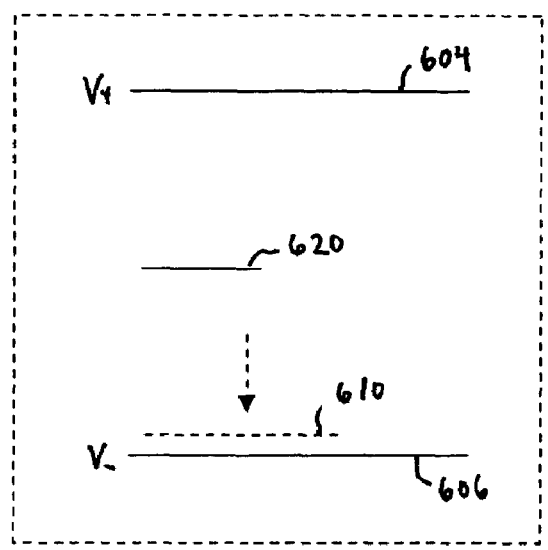

Memory 502 may be configured in a variety of ways to store data, including having one or more cells used to store a particular bit of data. For example, FIGS. 6A-6C show voltage values in a memory location 600 of memory 502, where memory location 600 is used to store a single bit of data. The bit of data stored in memory location 600 at any time can be a "0" data value or a "1" data value. Memory location 600 has an upper voltage limit 604 and a lower voltage limit 606. Voltage 620 is a mid-level voltage somewhere between upper and lower voltage limits 604 and 606, typically near a center voltage value.

FIG. 6A shows memory location 600 in an un-programmed state. For example, FIG. 6A may represent memory location 600 after tag 102 is manufactured, but prior to being programmed with data, such as data of the identification number of tag 102. Thus, as shown in FIG. 6A, un-programmed memory location 600 stores a voltage 602 which is typically below an upper voltage limit 604 and is close to a lower voltage limit 606 of memory location 600.

FIG. 6B shows memory location 600 in a programmed state. For example, FIG. 6B shows memory location 600 after being programmed with a high voltage 608 (which may represent a "1" bit of identification number 504 of tag 102, for example). Voltage 608 is closer to upper voltage limit 604 than un-programmed voltage 602 of FIG. 6A. FIG. 6C shows memory location 600 in another programmed state. For example, FIG. 6C shows memory location 600 after being programmed with a low voltage level 610 (which may represent a "0" bit of identification number 504 of tag 102, for example). Voltage 610 is close to lower voltage limit 606.

Non-volatile memories are frequently assumed to permanently hold the data stored within, without refresh, as opposed to dynamic random access memories (DRAMs), which require periodic refresh. Because of this, non-volatile memories do not have built-in refresh capability. However, over long periods of time, non-volatile memories can suffer from data loss. Such data loss can be due to drift of voltage 608 from its programmed value, as in FIG. 6B, toward its un-programmed value, as in FIG. 6A.

Figure 6D:
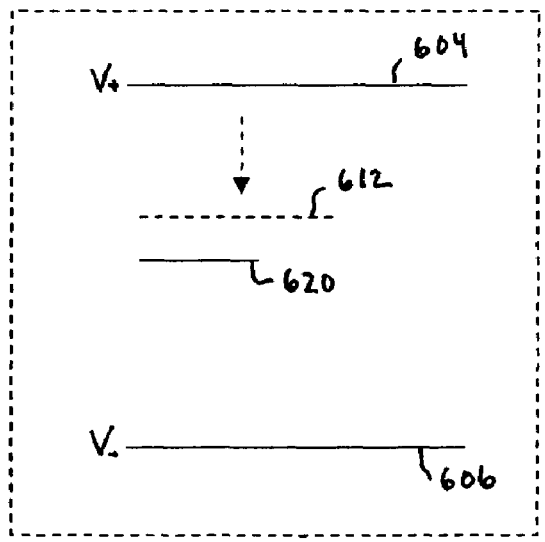

For example, FIG. 6D shows memory location 600 where the programmed high voltage has drifted from its level of FIG. 6B toward the un-programmed level of FIG. 6A. As shown in FIG. 6D, a drifted voltage 612 is a smaller voltage value than the programmed voltage 608 of FIG. 6B. Such voltage drift can occur in a non-volatile memory over a long period of time. Due to the drift, it can become more difficult to discern the high voltage bit data value stored in memory location 600 in FIG. 6D than in FIG. 6B. In a similar fashion, voltage drift from a low programmed voltage (e.g., voltage 610 of FIG. 6C) can make it more difficult to discern a stored low voltage bit data value.

Figure 7:
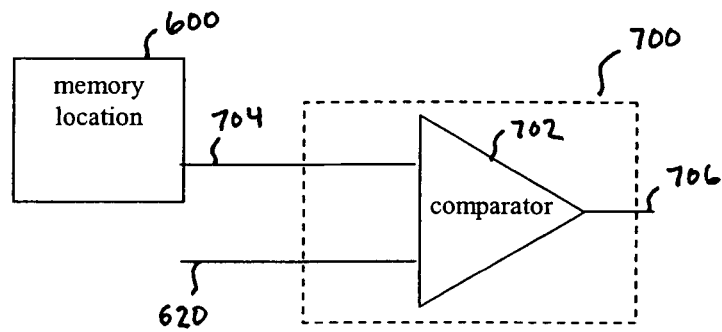
FIG. 7 shows an example circuit for reading data from a memory location in a tag.

A variety of circuit configurations are known for determining a bit value stored in a memory location. FIG. 7 shows an example bit value detection circuit 700. Circuit 700 is used is determine whether a high or low bit value is stored in memory location 600. Bit value detection circuit 700 includes a comparator 702. Comparator 702 receives as inputs mid-level voltage 620 and a voltage 704 currently stored in memory location 600. Comparator 702 compares mid-level voltage 620 to voltage 704 to determine whether a high or low bit data value is stored in memory location 600. If voltage 704 is higher than mid-level voltage 620, an output 706 of comparator 702 indicates that a high bit value is stored in memory location 600. If voltage 704 is lower than mid-level voltage 620, output 706 of comparator 702 indicates that a low bit value is stored in memory location 600

If a high voltage 608 is initially programmed into memory location 600, and the stored voltage drifts over time toward lower voltage limit 606, it becomes more difficult for comparator 702 to determine that a high data bit is stored in memory location 600. Eventually, voltage 704 may drift close to mid-level voltage 620, and even below mid-level voltage 620, such that comparator 702 no longer detects a high level voltage stored in memory location 600, but instead erroneously detects an indeterminate voltage or a low voltage. Thus, the high voltage initially programmed into memory location 600 indicating a stored high bit value is lost.

Figure 8A:
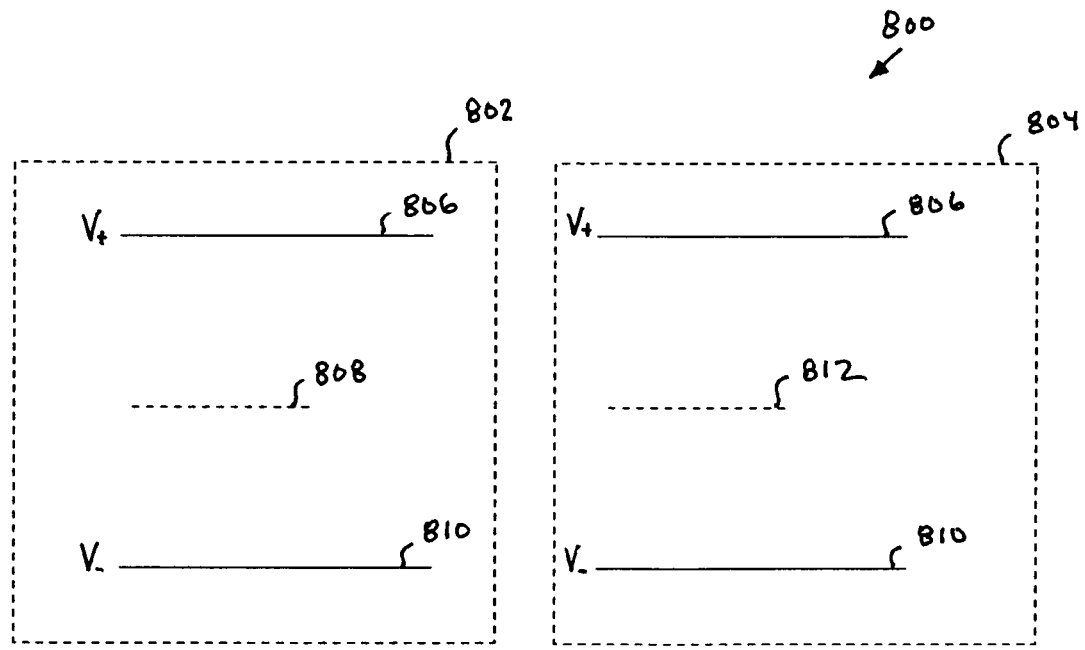
FIGS. 8A-8C show voltage values in a memory location of a tag memory, where the memory location has two cells used to store a single bit of data.
Figure 8B:
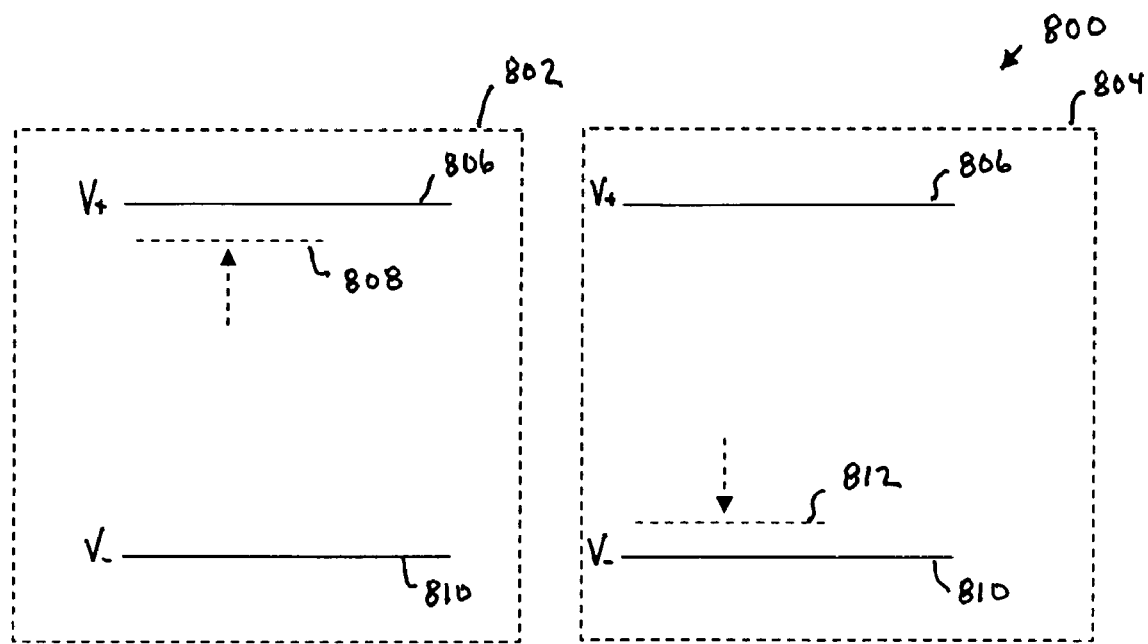
Figure 8C:
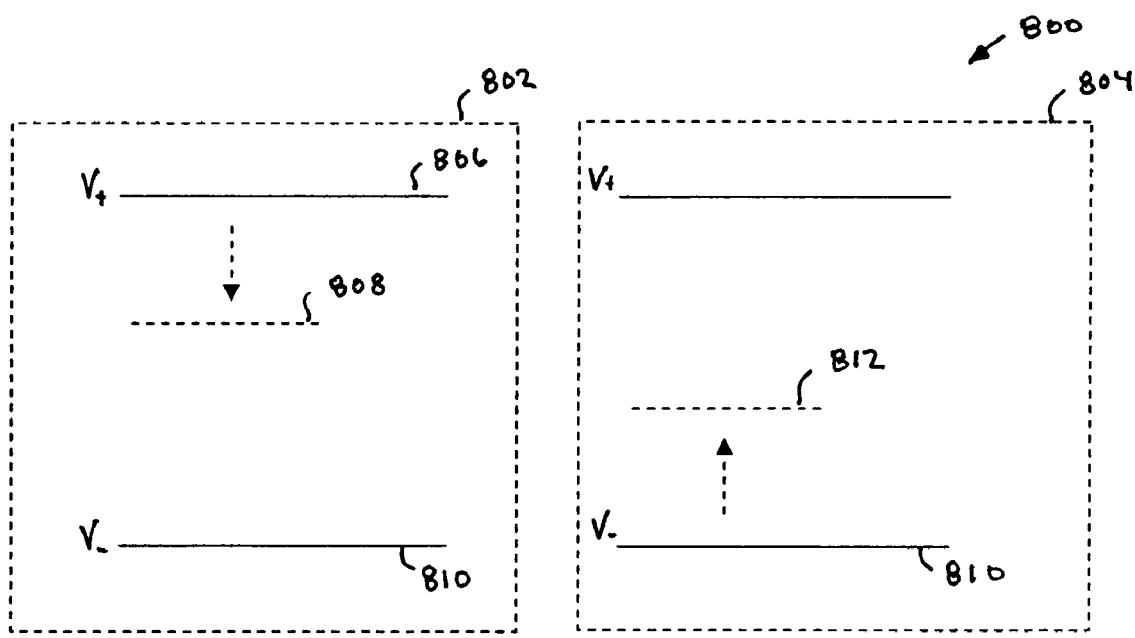

Similar data loss issues can occur with other memory configurations. For example, FIGS. 8A-8C show voltage values in a memory location 800 of memory 502, where memory location 800 has two cells used to store a single bit of data. The bit of data stored in memory location 800 at any time can be a "0" data value or a "1" data value. FIG. 8A shows memory location 800 with a first cell 802 and a second cell 804. Upper and lower voltage limits 806 and 810 are also shown in FIG. 8A for both of first and second cells 802 and 804. First cell 802 and 804 are differential storage cells, in that if a first bit value is stored in memory location 800 (e.g.,
a "0" data value), first cell 802 will store a high voltage while second cell 804 will store a low voltage. If a second bit value is stored in memory location 800 (e.g., a "1" data value), first cell 802 will store a low voltage while second cell 804 will store a high voltage.

First cell 802 stores a first cell voltage 808 and second cell 804 stores a second cell voltage 812. FIG. 8A shows memory location 800 in an un-programmed state. As shown in FIG. 8A, un-programmed first and second cell voltages 808 and 812 are voltages near a center voltage value between upper and lower voltage limits 806 and 810.

FIG. 8B shows memory location 800 in an example programmed state. Because first and second cells 802 and 804 are complimentary, first cell voltage 808 of first cell 802 is at a relatively high voltage level near upper voltage limit 806 and second cell voltage 812 of second cell 804 is at a relatively low voltage level near lower voltage limit 810. For example, these relative voltages may represent a "0" data value (or a "1" data value) stored in memory location 800.

As described above, data stored in non-volatile memories can drift over long periods of time. For example, FIG. 8C shows memory location 800 where first and second cell voltages 810 and 812 have drifted from their programmed levels of FIG. 8B toward their un-programmed levels of FIG. 8A. Thus, it is more difficult to discern (e.g., using comparators) the particular bit data value stored in memory location 800 in FIG. 8C as compared to FIG. 8B. Once first and second cell voltages 810 and 812 drift critically close to their un-programmed levels of FIG. 8A, the data stored in memory location 800 will be indeterminate, and thus the data is lost.

As further described below, according to embodiments of the present invention, data stored in tags is checked and refreshed if needed. Embodiments of the present invention are described in further detail below. Such embodiments may be implemented in the environments, readers, and tags described above, and/or in alternative environments and alternative RFID devices.

EXAMPLE MEMORY VERIFICATION AND REFRESH EMBODIMENTS

Tag memory verification and refresh embodiments are described herein. These embodiments can be implemented anywhere that tags are used. For example, embodiments can be implemented in a commercial or industrial environment, such as in a warehouse, a factory, a business, or store, and in a military or other non-commercial environment.

Figure 9:
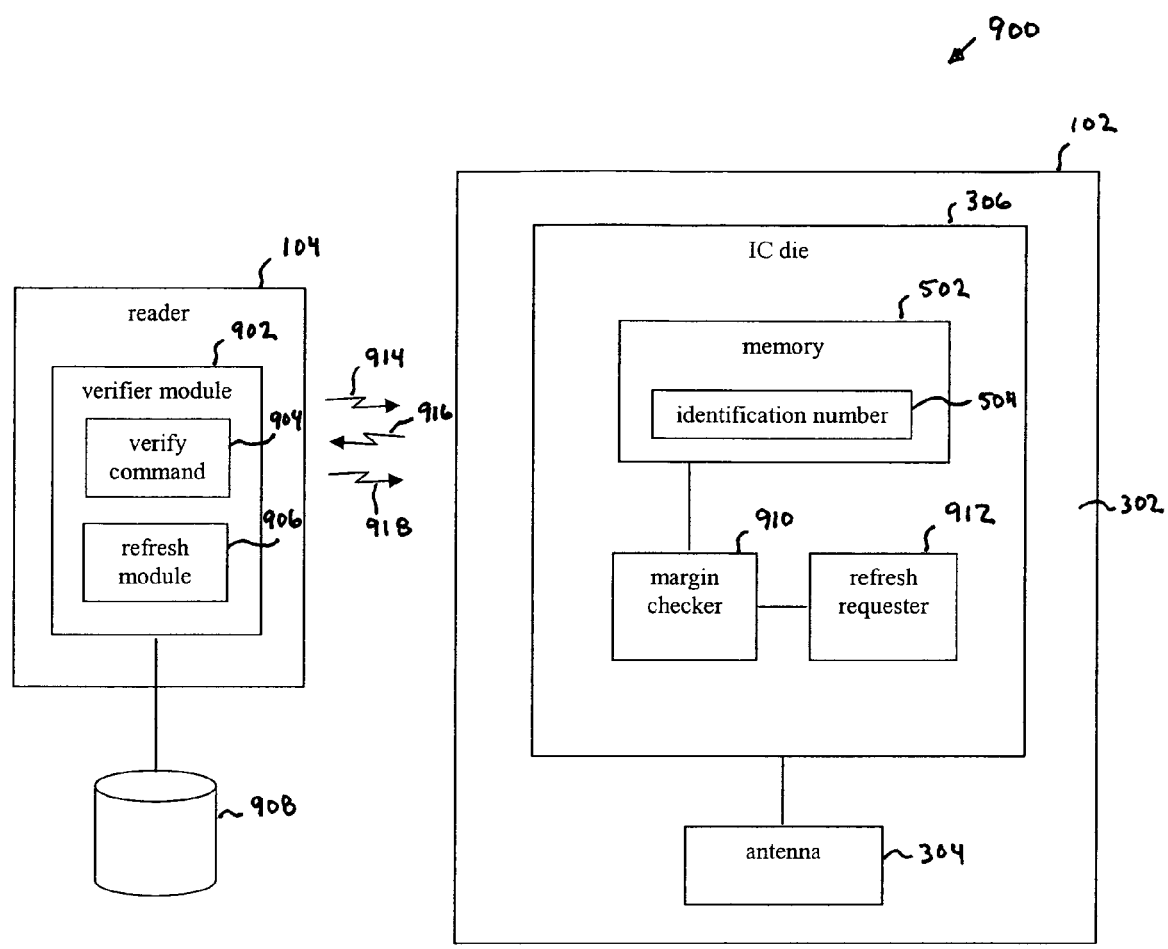
FIG. 9 shows a tag verification and refresh system, according to an embodiment of the present invention.

FIG. 9 shows a tag memory verification and refresh system 900, according to an embodiment of the present invention. As shown in FIG. 900, system 900 includes tag 102 and reader 104. In an embodiment, reader 104 communicates with tag 102 to initiate memory verification in tag 102, and to provide refresh data to tag 102 if needed. Further example description of tag 102 and reader 104 of FIG. 9, and operational description of system 900 is provided in the following subsections.

EXAMPLE READER EMBODIMENTS

As shown in FIG. 9, reader 104 includes a verifier module 902. Verifier module 902 includes a verify command 904 and a refresh module 906. Verifier module 902 is coupled to a database 908, which is shown external to reader 104 in FIG. 9, but may alternatively be internal to reader 104.

Verifier module 902 is configured to communicate (using receiver/transmitter functionality of reader 104, such as described above) with a tag, such as tag 102, to verify whether a data refresh is required for the tag. In an embodiment, if a data refresh is required, verifier module 902 provides the refresh data to the tag. Verifier module 902 may include any hardware, software, firmware, or any combination thereof, needed to perform its functions.

Figure 10:
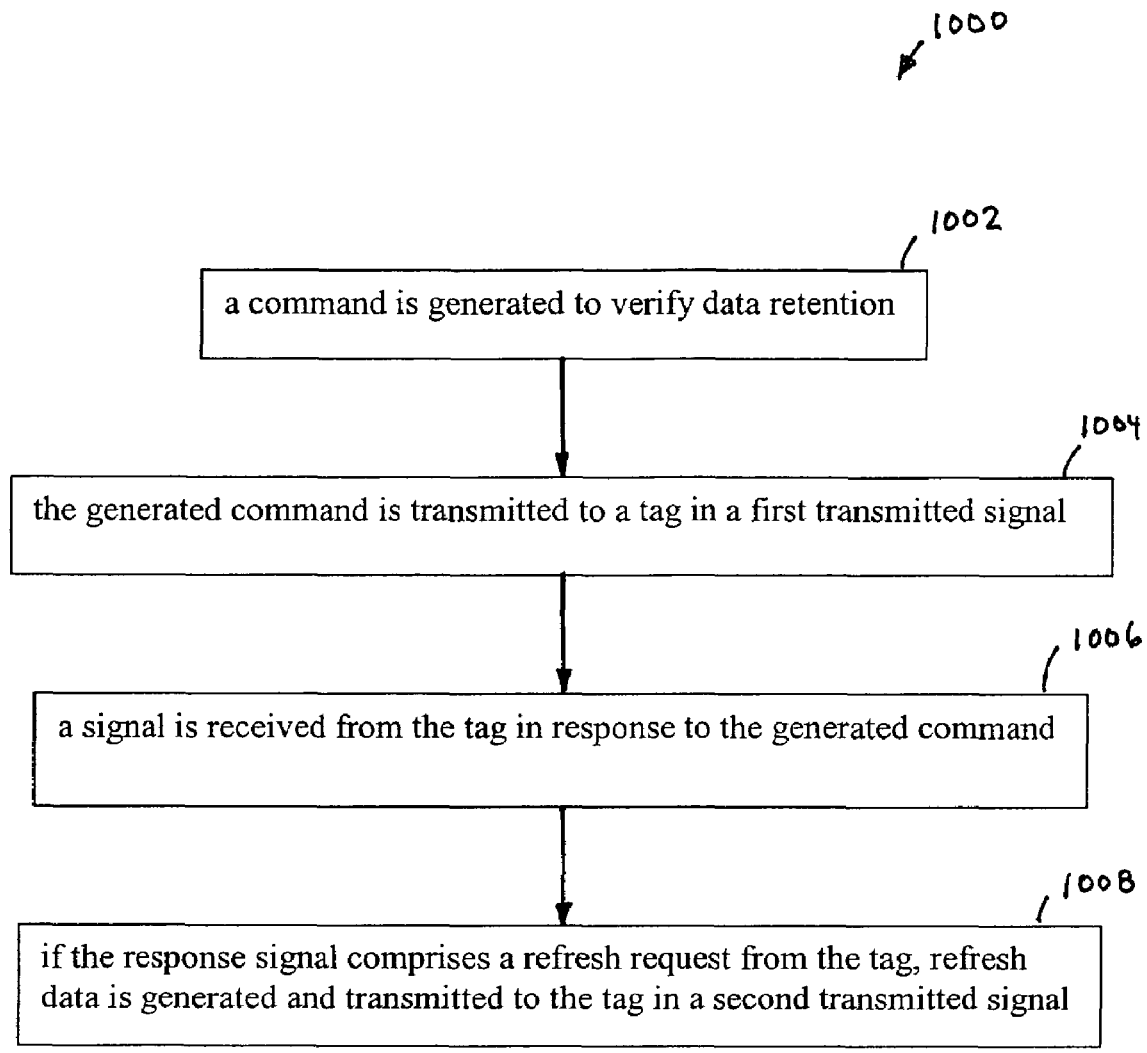
FIG. 10 shows a flowchart providing example steps in a reader for verifying and refreshing tag data, according to an embodiment of the present invention.

FIG. 10 shows a flowchart 1000 providing example steps for verifying and refreshing tag data according to verifier module 902. Other structural and operational embodiments will be apparent to persons skilled in the relevant art(s) based on the following discussion. The steps shown in FIG. 10 do not necessarily have to occur in the order shown.

Flowchart 1000 begins with step 1002. In step 1002, a command is generated to verify data retention. For example, the command is verify command 904 shown in FIG. 9, which may be stored in verify module 902. Verify command 904 may be configured in any manner, and in accordance with any RFID communications protocol mentioned elsewhere herein, or otherwise known by persons skilled in the relevant art(s). For example, verify command 904 may be formatted in accordance with the EPC Gen 2 RFID protocol. In such an embodiment, verify command 904 may be a CUSTOM command. Furthermore, verify command 904 may be configured to be directed to a single tag, or to a group of tags, even including all tags in communications range of reader 104.

In an embodiment, verify command 904 may include one or more parameters. For example, verify command 904 may include a voltage threshold parameter. The voltage threshold parameter may be used in the targeted tag to dictate that a desired voltage margin be maintained in a memory location. Alternatively, verify command 904 does not include a parameter, and merely instructs one or more tags to perform memory verification.

In step 1004, the generated command is transmitted to a tag in a first transmitted signal. For example, the first transmitted signal is first transmitted signal 914 shown in FIG. 9. The generation and transmission of verify command 904 may be initiated by a user of reader 104 (e.g., by a button or trigger), a mechanism internal to reader 104, by an external computer system that communicates with reader 104, or by other mechanism.

In step 1006, a signal is received from the tag in response to the generated command. For example, the received signal is response signal 916, which is received from tag 102 in FIG. 9.

In step 1008, if the response signal comprises a refresh request from the tag, refresh data is generated and transmitted to the tag in a second transmitted signal. For example, response signal 916 is analyzed in verifier module 902 for an indication (e.g., a data string, etc.) of a refresh request by tag 102. If a refresh request is indicated, refresh module 906 generates (e.g., formats) a signal to be transmitted to tag 102 that includes refresh data. For example, the refresh data may include the identification number of tag 102. Database 908 may store data related to tag 102. Thus, if needed, refresh module 906 communicates (wirelessly or in a wired fashion) with database 908, to obtain refresh data. Refresh module 906 obtains the necessary data from database 908 (if needed), and formats the data into a data string to be transmitted to tag 102. The data string is transmitted to tag 102 in a second transmitted signal, shown as second transmitted signal 918 in FIG. 9. Tag 102 receives second transmitted signal 918, and uses the refresh data to refresh its stored data as needed.

Note that although not shown in FIG. 9, or indicated in flowchart 1000 of FIG. 10, after refreshing its memory with the received refresh data, tag 102 may transmit a confirmation signal to reader 104 to indicate that its memory was successfully refreshed. Alternatively, tag 102 may transmit a signal to reader 104 indicating the refresh was unsuccessful, and/or indicating that refresh data should be retransmitted, and/or that additional and/or alternative data should be transmitted by reader 104 to tag 102.

Note that in an alternative embodiment, first transmitted signal 914 may contain refresh data along with verify command 904. Tag 102 uses the refresh data if it determines that a refresh is required. Thus, in such an embodiment, step 1006 and/or step 1008 may not be required.

EXAMPLE TAG EMBODIMENTS

As shown in FIG. 9, tag 102 includes IC 306 and antenna 304. IC 306 includes memory 502, a margin checker 910, and a refresh requester 912. Memory 502 is shown including identification number 504, although memory 502 can include additional and/or alternative data.

Figure 11:
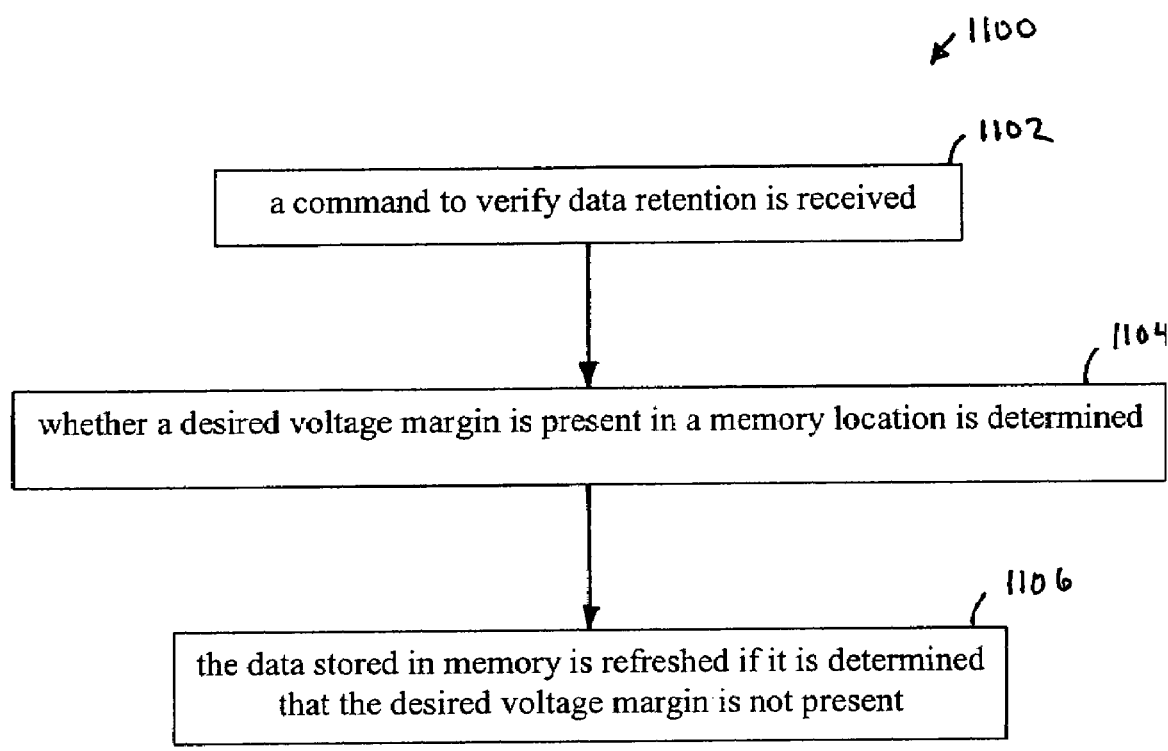
FIG. 11 shows a flowchart providing example steps in a tag for verifying and refreshing tag data, according to an embodiment of the present invention.

Margin checker 910 is configured to check memory 502 to determine whether a data refresh is required. Margin checker 910 may check memory 502 on a periodic basis, or upon occurrence of an event, such as receipt of verify command 904 from reader 104. If a verify command 904 is received, and a data refresh is required, refresh requester 912 generates a refresh request to be transmitted to reader 104. Margin checker 910 and refresh requester 912 may include any hardware, software, firmware, or any combination thereof, needed to perform their functions. FIG. 11 shows a flowchart 1100 providing example steps in a tag for checking a memory location and refreshing tag data. Other structural and operational embodiments will be apparent to persons skilled in the relevant art(s) based on the following discussion.

Flowchart 1100 begins with step 1102. In step 1102, a command to verify data retention is received. For example, antenna 304 of tag 102 receives verify command 904 from reader 104 in first transmitted signal 914. Tag 102 may include a demodulator and decoder logic for recovering verify command 904 from first transmitted signal 914. Example description of a tag RF communication architecture is described in U.S. Pat. No. 6,989,750, titled "Radio Frequency Identification Architecture," which is incorporated by reference herein its entirety. Tag 102 may communicate according to any communications protocol mentioned herein or otherwise known.

In step 1104, whether a desired voltage margin is present in a memory location is determined. For example, receipt of verify command 904 causes margin checker 910 to verify whether data stored in one or more memory locations of memory 502 need refresh. In an embodiment margin checker 910 accomplishes that by checking a voltage margin in the one or more memory locations. For example, for a particular memory location, margin checker 910 determines whether a voltage stored in the memory location is higher than (for a stored high voltage) or lower than (for a stored low voltage) a desired voltage level, and thus has sufficient voltage margin. For a stored high voltage, if the stored voltage has drifted lower than the desired voltage level, or for a stored low voltage, if the stored voltage has drifted above the desired voltage level, sufficient voltage margin is not present, and thus refresh is needed. Margin checker 910 can be configured to verify data stored in memory 502 in a variety of ways, several examples of which are illustrated further below.

In step 1106 of FIG. 11, the data stored in memory is refreshed if it is determined that the desired voltage margin is not present. For example, if margin checker 910 of FIG. 9 determines that the desired voltage margin is not present in one or more memory locations 600 of memory 502, refresh requester 912 may generate a refresh data request to be transmitted to reader 104. For example tag 102 may transmit response signal 916, including the refresh data request. The refresh data request may merely indicate that a default request for refresh data (e.g., identification number) is requested, or may include a detailed request for specific data, data portions, etc. Once the refresh data is received by tag 102, the refresh data is programmed into the memory.

TAG MEMORY VERIFICATION EMBODIMENTS

Example process, system, and device embodiments for performing step 1104 with regard to various example tag memories are described as follows. These examples are provided for illustrative purposes, and are not limiting. The examples described herein may be adapted to any type of tag memory device, including memory devices having single-cell memory locations, two-cell memory locations, and/or to further memory location types. In an embodiment, a single margin checker 910 is present to interface with one or more memory locations of memory 502. For example, a single margin checker 910 may interface with multiple memory locations using a multiplexer or other logic/mechanism. Alternatively, a plurality of margin checkers 910 may be present that each interface with one or more memory locations. Any number of margin checkers 910 can be present so that any number of one or more bits of memory 502 can be checked, as desired by the particular implementation.

Figure 12:
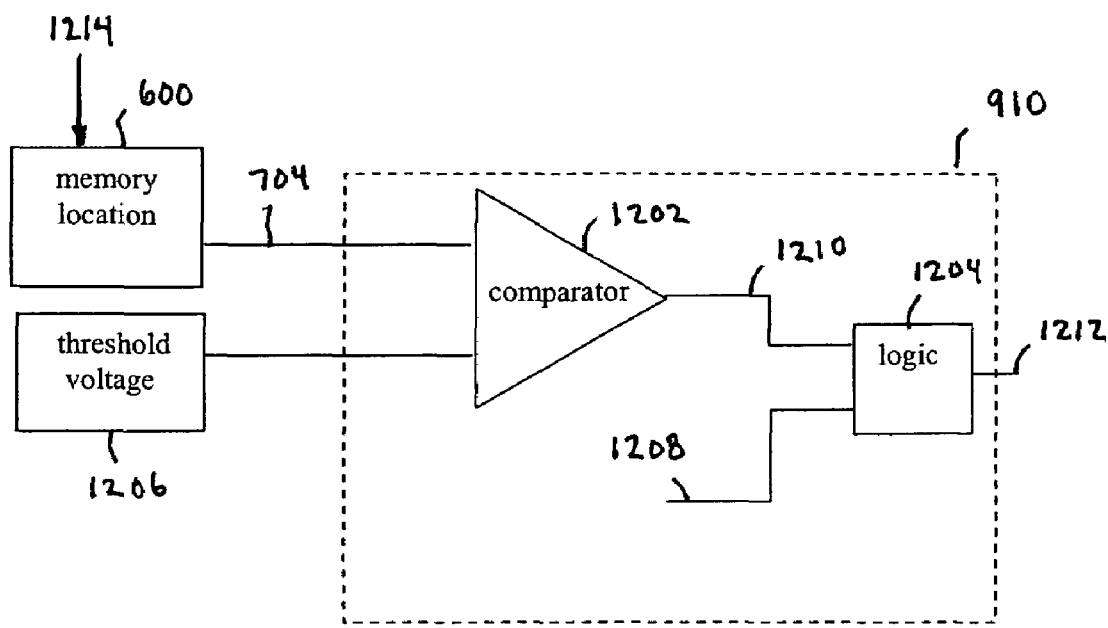
FIG. 12 shows an example memory location checker, according to an embodiment of the present invention.

For example, FIG. 12 shows an example margin checker 910 implemented in IC 306, according to an embodiment of the present invention. Margin checker 910 is used to check contents of a memory location, such as memory location 600 to determine whether an acceptable voltage margin is present. In the embodiment of FIG. 12, margin checker 910 is configured to check whether a high voltage (indicating a "1" bit) previously stored in memory location 600 has drifted (over time) below an acceptable voltage margin. If the high voltage has drifted below the acceptable voltage margin, the high voltage stored in memory location 600 needs to be refreshed.

In the embodiment of FIG. 12, margin checker 910 includes a comparator 1202 and logic 1204. Comparator 1202 receives voltage 704 currently stored in memory location 600 and a threshold voltage 1206. Comparator 1202 compares voltage 704 to threshold voltage 1206 to determine whether sufficient voltage margin is present. Comparator 1202 outputs a voltage margin indicator signal 1210 (e.g., a "0" or "1"). Voltage margin indicator signal 1210 indicates whether voltage 704 is greater than threshold voltage 1206.

Note that in an embodiment, threshold voltage 1206 is a value that is permanently stored in IC 306. In another embodiment, threshold voltage 1206 is a value that may be received as a parameter of verify command 904, and thus may be variable, as determined by reader 104.

Logic 1204 is optional. For example, logic 1204 may be present when a first margin checker 910 is present for checking memory location 600 when a high voltage is stored therein, and a second margin checker 910 is present for checking memory location 600 when a low voltage is stored therein. Logic 1204 receives voltage margin indicator signal 1210 and an enable signal 1208. Enable signal 1208 enables logic 1204 to process voltage margin indicator signal 1210. For example, enable signal 1208 enables logic 1204 when a "1" bit value was previously stored in memory location 600. If a "0" value was previously stored in memory location 600, logic 1204 is not enabled, and a second margin checker (not shown in FIG. 12) may operate on memory location 600. The second margin checker may be configured to check whether a low voltage (indicating a "0") bit previously stored in memory location 600 has drifted above an acceptable voltage margin, in an analogous fashion to margin checker 910. If logic 1204 is enabled, logic 1204 processes voltage margin indicator signal 1210, and outputs a refresh indicator signal 1212 (e.g., a "0" or "1"), which indicates whether memory location 600 needs to be refreshed.

Figure 13:
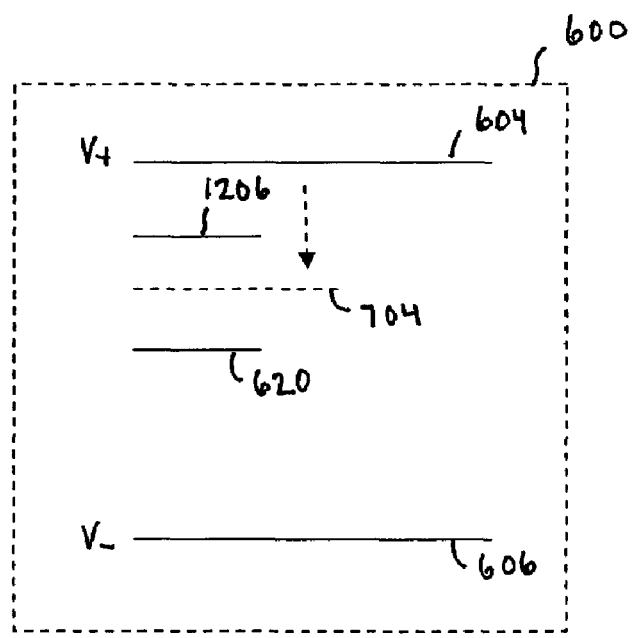
FIG. 13 shows example voltages related to a memory location, according to an embodiment of the present invention.

FIG. 13 illustrates voltage values related to memory location 600, to illustrate example operation of margin checker 910 of FIG. 12. As described above, in the current example, a high voltage level representing a "1" data bit was originally stored in memory location 600. However, as shown in FIG. 13, voltage 704 (representing the "1" data bit) stored in memory location 600 is drifting downwards over time. In fact, in FIG. 13, voltage 704 has drifted lower than threshold voltage 1206. Thus, in this example, comparator 1202 outputs a voltage margin indicator signal 1210 indicating an insufficient voltage margin is present. Even though a data "1" can still be read from memory location 600 at the current time (e.g., using circuit 700 of FIG. 7), voltage 704 has dropped to a level where memory location 600 should be refreshed to increase voltage margin, so that voltage 704 does not drop further, and cause memory location 600 to become un-programmed.

In the current example, because a "1" data bit was originally stored in memory location 600, enable signal 1208 of FIG. 12 enables logic 1204 to process voltage margin indicator signal 1210. Logic 1204 processes voltage margin indicator signal 1210, and outputs refresh indicator signal 1212, which indicates that memory location 600 needs to be refreshed, because an insufficient voltage margin was indicated.

It is noted that in an analogous fashion, margin checker 910 of FIG. 12 may be configured to check whether a low voltage (indicating whether a "0" bit) previously stored in memory location 600 has drifted above an acceptable voltage threshold value. However, for reasons of brevity, only the high voltage checker configuration for margin checker 910 is described in detail herein. However, persons skilled in the relevant art(s) would understand from the teachings herein how margin checker 910 can be modified (or a second margin checker 910 can be present) into a low voltage checker configuration. Such a configuration is within the scope and spirit of the present invention.

As described above, embodiments of margin checker 910 can be used to check memory locations having two cells, such as two-cell memory location 800 of FIG. 8. Margin checker 910 can be configured to interface with the two cells in various ways.

Figure 14:
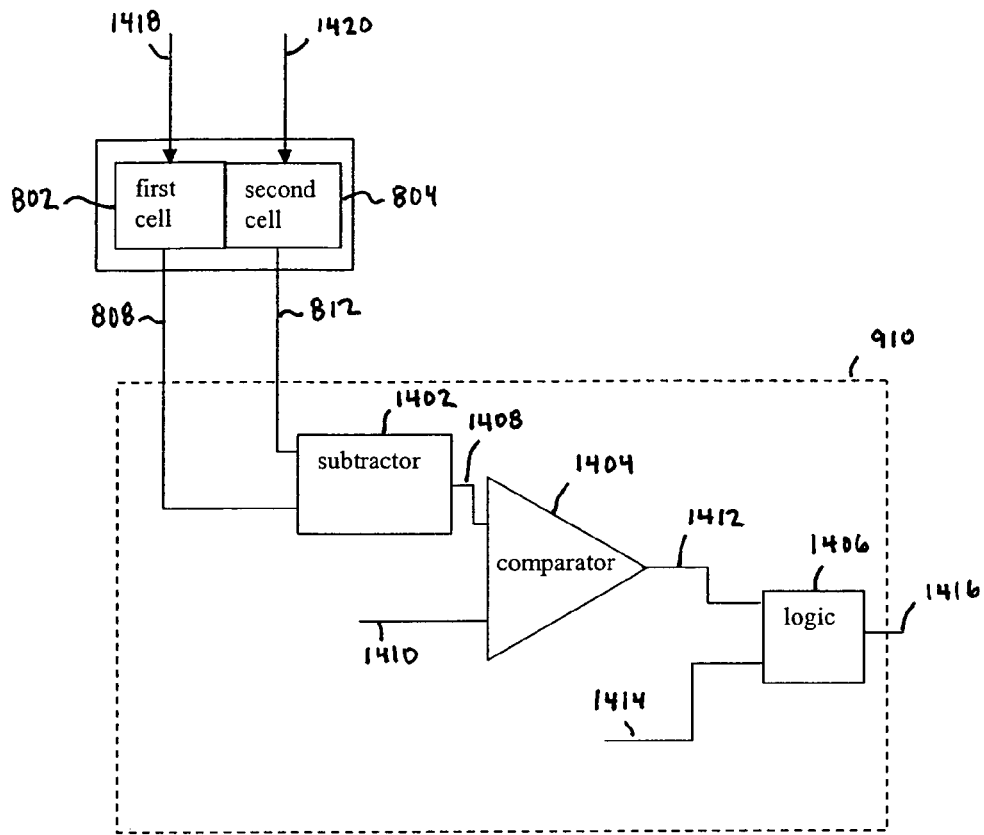
FIG. 14 shows an example two-cell memory location checker, according to an embodiment of the present invention.

For example, FIG. 14 shows an embodiment for margin checker 910 that receives first cell voltage 808 of first cell 802 and second cell voltage 812 of second cell 804 of memory location 800. As shown in FIG. 14, margin checker 910 includes a subtractor 1402, a comparator 1404, and a logic 1406. Operation of margin checker 910 is described as follows with respect to FIG. 15, which shows voltages stored in first and second cells 802 and 804. In this description, first cell voltage 808 of first cell 802 is at a relatively high voltage level near upper voltage limit 806 and second cell voltage 812 of second cell 804 is at a relatively low voltage level near lower voltage limit 810. For example, these relative voltages may represent a "0" data value (or a "1" data value), stored in memory location 800.

Figure 15:
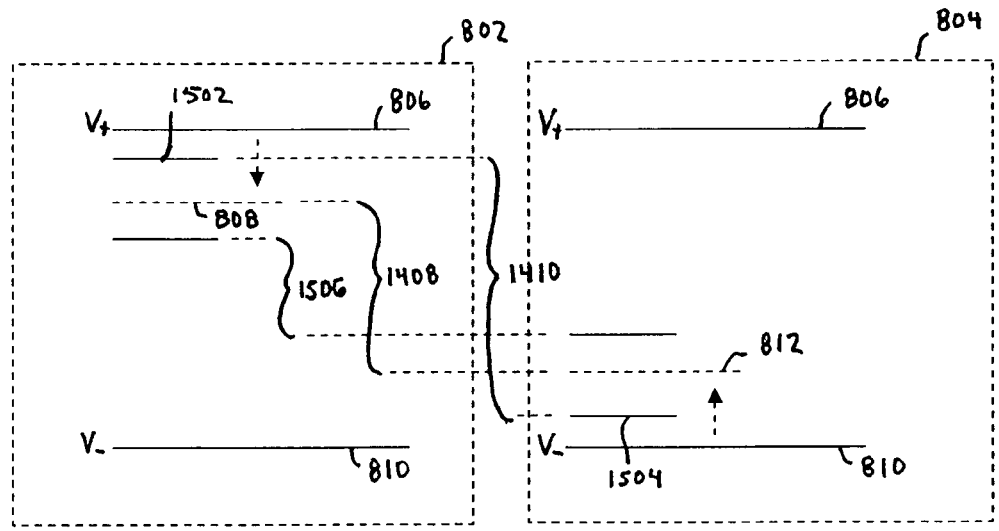
FIG. 15 shows example voltages related to first and second cells associated with a two-cell memory location, according to an embodiment of the present invention.

As shown in FIG. 15, first cell voltage 808 is drifting lower over time, and second cell voltage 812 is drifting higher over time. At some point, if left unchecked, first and second cell voltages 808 and 812 will drift until data stored in memory location 800 is lost.

Subtractor 1402 receives first and second cell voltages 808 and 812. Subtractor 1402 subtracts second cell voltage 808 from first cell voltage 812 and outputs a cell difference voltage 1408. Cell difference voltage 1408 is indicated in FIG. 15. Cell difference voltage 1408 is a voltage difference between first and second cell voltage 808 and 812.

Comparator 1404 receives cell difference voltage 1408 and a differential threshold voltage 1410. Differential threshold voltage 1410 may be determined by subtracting a desired low voltage threshold for cells 802 and 804 from a desired high voltage threshold for cells 802 and 804. An example of differential threshold voltage 1410 is shown in FIG. 15, for illustrative purposes, shown between example desired high and low voltage thresholds 1502 and 1504. Comparator 1404 compares cell difference voltage 1408 and differential threshold voltage 1410, and outputs a voltage margin indicator signal 1412 (e.g., a "1" or "0"). If cell difference voltage 1408 is not greater than differential threshold voltage 1410, voltage margin indicator signal 1412 indicates that first and second cells 802 and 804 need to be refreshed. Thus, differential threshold voltage 1410 is used to maintain a sufficient differential voltage margin between first cell voltage 808 and second cell voltage 812.

Note that in an embodiment, differential threshold voltage 1410 is a value that is permanently stored in IC 306. In another embodiment, differential threshold voltage 1410 is a value that may be received as a parameter of verify command 904, and thus may be variable, as determined by reader 104.

In the example of FIG. 15, differential threshold voltage 1410 is greater than cell difference voltage 1408. Thus, comparator 1404 outputs a voltage margin indicator signal 1412 indicating that first and second cells 802 and 804 need to be refreshed. If differential threshold voltage 1410 is less than cell difference voltage 1408, than a sufficient voltage margin still exists, and first and second cells 802 and 804 would not need to be refreshed.

Note that cells 802 and 804 may need to be refreshed even if valid data can be read from memory location 800. For example, FIG. 15 shows a valid data differential threshold voltage 1506. As long as cell difference voltage 1408 is greater than valid data differential threshold voltage 1506 (even though it is less than differential threshold voltage 1410), valid data can be read from memory location 800. However, in the example of FIG. 15, because it has been determined that sufficient voltage margin is not present in memory 800, the data value of memory location 800 still needs to be refreshed.

Logic 1406 is optional. For example, logic 1406 may be present when a first margin checker 910 is present for checking memory location 800 when a data "1" value is stored therein, and a second margin checker 910 is present for checking memory location 800 when a data "0" value is stored therein. Logic 1406 receives voltage margin indicator signal 1412 and an enable signal 1414. Enable signal 1414 enables logic 1406 to process voltage margin indicator signal 1412. For example, enable signal 1414 enables logic 1406 when a "1" bit value was previously stored in memory location 800. If a "0" value was previously stored in memory location 800, logic 1406 is not enabled, and a second margin checker (not shown in FIG. 14) may operate on memory location 800. The second margin checker may be configured to check whether cell difference voltage 1408 for a data "0" value previously stored in memory location 600 no longer has an acceptable differential voltage margin. If logic 1406 is enabled, logic 1406 processes voltage margin indicator signal 1412, and outputs a refresh indicator signal 1416 (e.g., a "1" or "0"), which indicates whether memory location 600 needs to be refreshed.

It will be understood by persons skilled in the relevant art(s) that alternatively first cell 802 may store a low voltage and second cell 804 may store a high voltage, together representing a "1" data value (or a "0" data value) for memory location 800, and that margin checker 910 of FIG. 14 may be correspondingly configured. For example, in such an embodiment, differential threshold voltage 1410 may have a polarity opposite than in the above example, or subtractor 1402 could instead subtract first cell voltage 808 from second cell voltage 812.

Figure 16:
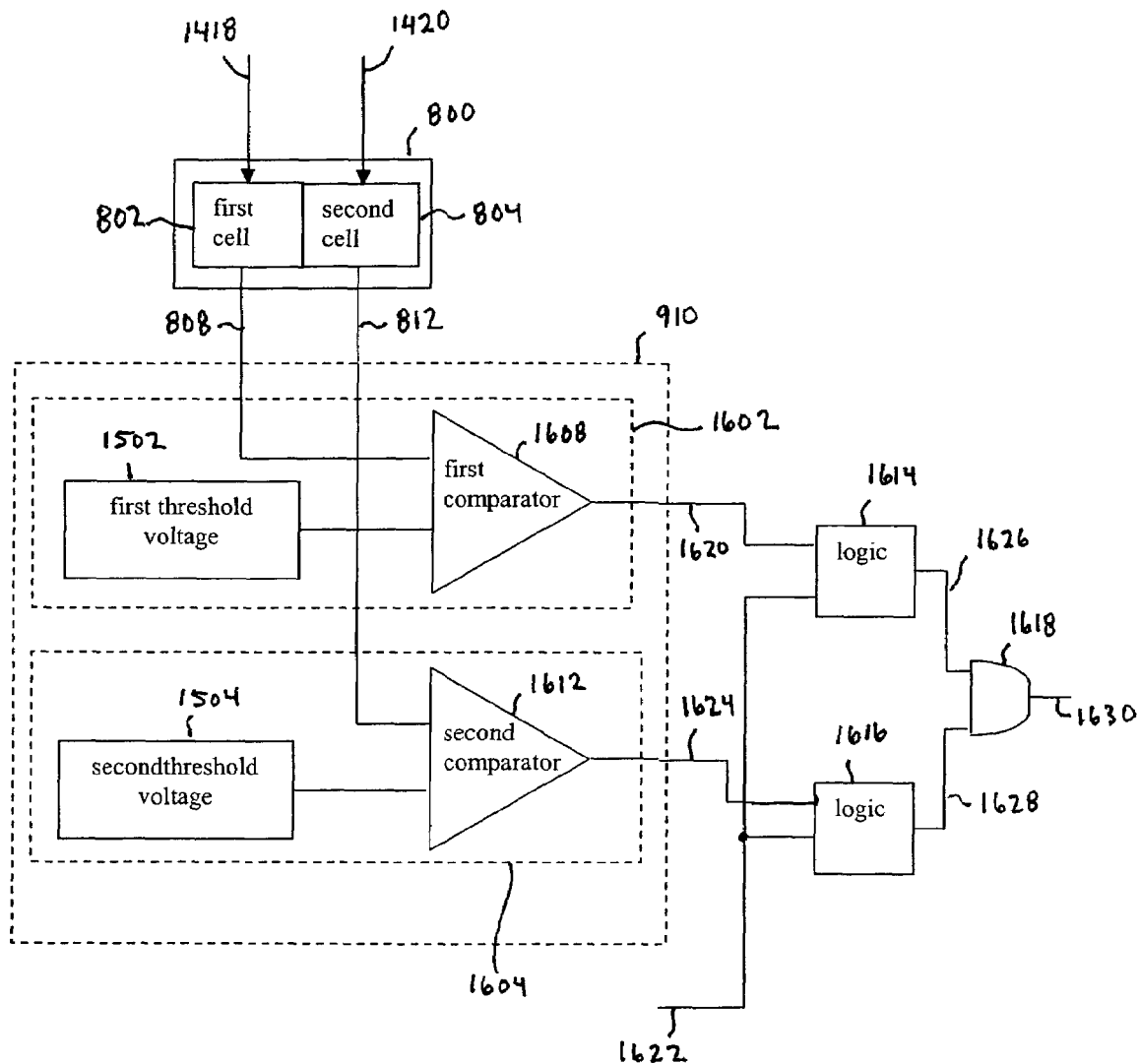
FIG. 16 shows an example two-cell memory location checker, according to an embodiment of the present invention.

FIG. 16 shows another embodiment for margin checker 910 used to check a memory location having two cells. Operation of margin checker 910 of FIG. 16 is described as follows with respect to the voltages shown in FIG. 15. As shown in FIG. 16, margin checker 910 includes an upper margin checker 1602 and a lower margin checker 1604. Upper margin checker 1602 receives first cell voltage 808 of first cell 802 and second margin checker 1604 receives second cell voltage 812 of second cell 804. Upper margin checker 1602 is used to check a voltage margin of first cell voltage 808 and lower margin checker 1604 is used to check a voltage margin of second cell voltage 812.

As shown in FIG. 16, upper margin checker 1602 includes a first comparator 1608 that receives a first threshold voltage 1502, an example of which is shown in FIG. 15. Upper margin checker 1602 compares first cell voltage 808 to first threshold voltage 1502. If first cell voltage 808 is greater than first threshold voltage 1502, than a proper upper voltage margin is maintained in first cell 802. First comparator 1608 outputs upper voltage margin indicator signal 1620 (e.g., a "1" or "0"), which indicates whether first cell voltage 808 is greater than first threshold voltage 1502.

Lower margin checker 1604 includes a second comparator 1612 that receives a second threshold voltage 1504. Lower margin checker 1604 compares second cell voltage 812 to second threshold voltage 1504, an example of which is shown in FIG. 15. If second cell voltage 812 is greater than second threshold voltage 1504, than a proper lower voltage margin is maintained in second cell 804. Second comparator 1612 outputs lower voltage margin indicator signal 1624 (e.g., a "1" or "0"), which indicates whether second cell voltage 812 is lower than second threshold voltage 1504.

For example, as shown in FIG. 15, first cell voltage 808 of first cell 802 is at a relatively high voltage level near upper voltage limit 806 and second cell voltage 812 of second cell 804 is at a relatively low voltage level near lower voltage limit 810. As shown in FIG. 15, first cell voltage 808 is drifting lower over time, and second cell voltage 812 is drifting higher over time. At some point, if left unchecked, first and second cell voltages 808 and 812 will drift until data stored in memory location 800 is lost.

First comparator 1608 compares first threshold voltage 1502 and first cell voltage 808. In the example of FIG. 15, first threshold voltage 1502 is greater than first cell voltage 808. Thus, comparator 1608 outputs upper voltage margin indicator signal 1620, which indicates a refresh of first cell 802 is needed. Likewise, second comparator 1612 compares second threshold voltage 1504 and second cell voltage 812. In the example of FIG. 15, second threshold voltage 1504 is less than second cell voltage 812. Thus, comparator 1612 outputs lower voltage margin indicator signal 1624, which indicates a refresh of second cell 804 is needed.

Note that in an embodiment, first and second threshold voltages 1502 and 1504 are values that are permanently stored in IC 306. In another embodiment, first and second threshold voltages 1502 and 1504 may be received as parameters of verify command 904, and thus may be variable, as determined by reader 104.

Logic for processing upper and lower voltage margin indicator signals 1620 and 1624 is optional. For example, this logic may be present when a first margin checker 910 is present for checking memory location 800 when a data "1" value is stored therein, and a second margin checker 910 is present for checking memory location 800 when a data "0" value is stored therein. Example logic is shown in FIG. 16, including a first logic 1614, a second logic 1616, and a third logic 1618.

First logic 1614 receives upper voltage margin indicator signal 1620 and an enable signal 1622. Second logic 1616 receives lower voltage margin indicator signal 1624 and enable signal 1622. Enable signal 1622 enables first logic 1614 to process upper voltage margin indicator signal 1620 and second logic 1616 to process lower voltage margin indicator signal 1624. For example, enable signal 1622 enables first and second logic 1614 and 1616 when a "1" bit value was previously stored in memory location 800. If a "0" value was previously stored in memory location 800, first and second logic 1614 and 1616 are not enabled, and a second margin checker (not shown in FIG. 16) may operate on memory location 800. The second margin checker may be configured to check whether a data "0" value previously stored in memory location 600 no longer has an acceptable differential voltage margin.

If first and second logic 1614 and 1616 are enabled, first logic 1614 processes upper voltage margin indicator signal 1620, and outputs a first refresh indicator signal 1626 (e.g., a "1" or "0"), which indicates whether first cell 802 needs to be refreshed. Second logic 1614 processes lower voltage margin indicator signal 1624, and outputs a second refresh indicator signal 1628 (e.g., a "1" or "0"), which indicates whether second cell 804 needs to be refreshed Third logic 1618 receives first and second refresh indicator signals 1626 and 1628, and outputs and indication whether memory location 800 needs to be refreshed. For example, if either of, or both of first and second refresh indicator signals 1628 indicate that their respective cell needs to be refreshed, third logic 1618 outputs a refresh indicator signal 1630 indicating that memory location 800 (i.e., both of cells 802 and 804) needs to be refreshed.

In an alternative embodiment, first cell 802 is refreshed based on first refresh indicator signal 1626 and second cell 804 is refreshed based on second refresh indicator signal 1628. In others, in an embodiment, in some situations, one of first and second cells 802 and 804 may be refreshed, while the other cell is not refreshed.

It will be understood by persons skilled in the relevant art(s) that alternatively first cell 802 may store a low voltage and second cell 804 may store a high voltage, together representing a "1" data value (or a "0" data value) for memory location 800, and that margin checker 910 of FIG. 16 may be correspondingly configured. For example, in such an embodiment, the polarities of first and second threshold voltages 1502 and 1504 may be switched.

TAG MEMORY REFRESH EMBODIMENTS

Figure 17:
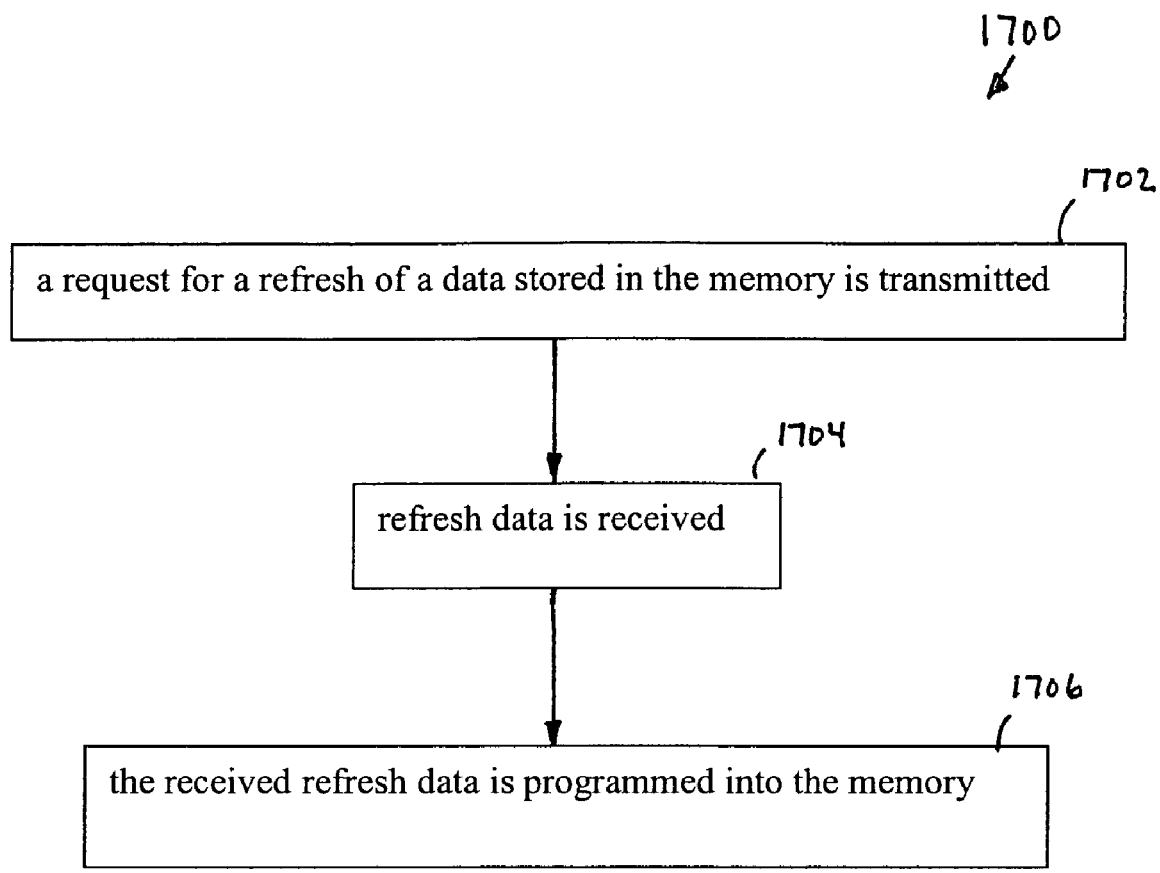
FIG. 17 shows a flowchart providing example steps for refreshing data in a tag, according to an embodiment of the present invention.

Step 1106 of FIG. 11 may be implemented in any manner. For example, FIG. 17 shows a flowchart 1700 providing example steps in a tag for performing step 1106 of FIG. 11. Other structural and operational embodiments will be apparent to persons skilled in the relevant art(s) based on the following discussion.

Flowchart 1700 begins with step 1702. In step 1702, a request for a refresh of a data stored in the memory is transmitted. For example, as shown in FIG. 9, tag 102 transmits response signal 916 to reader 104. Response signal 916 provides an indication that refresh data is requested.

In step 1704, refresh data is received. For example, as shown in FIG. 9, tag 102 receives second transmitted signal 918 from reader 104. Second transmitted signal 918 includes refresh data.

In step 1706, the received refresh data is programmed into the memory. For example, the refresh data is input to memory 502 to overwrite/refresh particular memory locations, including even the entirety of memory 502. For instance, as shown in FIG. 12, refresh data for memory location 600 may be received by memory location 600 via data input 1214. As shown in FIGS. 14 and 16, refresh data for memory location 800 may be received by memory location 800 via first and second cell data inputs 1418 and 1420.

Note that in an alternative embodiment, refresh data is not requested from reader 104. Instead, the data that is stored in the memory location is read and looped back into the data input of the memory location to refresh the data. For example, in the embodiment of FIG. 12, the data value of voltage 704 is input back into memory location 600 via data input 1214. In the embodiments of FIGS. 14 and 16, the values of first and second cell voltages 808 and 812 are input back into memory location 800 via first and second cell data inputs 1418 and 1420. Thus, in such an embodiment, refresh data may not need to be supplied by reader 104. Furthermore, in such an embodiment, refresh requester 912 of FIG. 9 may not be required.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for retention of data stored in a non-volatile memory of a radio frequency identification (RFID) tag, comprising:

receiving at the tag a command to verify data retention;

determining whether a desired voltage margin is present in a memory location of the non-volatile memory of the tag; and refreshing the data stored in the non-volatile memory if it is determined that the desired voltage margin is not present, wherein the command is transmitted by a reader according to an EPC Gen 2 communications protocol, wherein the command is a CUSTOM command, wherein said receiving comprises receiving at the tag the CUSTOM command.

2. The method of claim 1, wherein said receiving comprises:

receiving a threshold voltage margin parameter.

3. The method of claim 1, wherein said determining comprises:
   comparing a voltage margin present in the memory location to a threshold voltage margin.

4. The method of claim 1, wherein the memory location is a two-cell memory location having a first cell and a second cell, wherein the two-cell memory location stores one bit of data, said determining comprises:
   comparing a difference between a first voltage stored in the first cell and a second voltage stored in the second cell to a threshold voltage margin.

5. The method of claim 1, further comprising prior to said receiving:
   receiving an identification number from a first reader, and
   programming the received identification number into the non-volatile memory.

6. The method of claim 5, wherein said receiving comprises:
   receiving the command from a second reader.

7. The method of claim 1, wherein said refreshing comprises:
   transmitting a request for a refresh of a data stored in the non-volatile memory;
   receiving refresh data, and
   programming the received refresh data in to the non-volatile memory.

* * * * *